United States Patent
Lim

(10) Patent No.: US 8,271,490 B2
(45) Date of Patent: Sep. 18, 2012

(54) SYSTEM FOR GENERATING PERMALINK OF MASH-UP MAP

(75) Inventor: Seung Phill Lim, Gyeonggi-do (KR)

(73) Assignee: NHN Corporation, Seongnam-si (KR)

(*) Notice: Subject to any disclaimer, the term of this patent is extended or adjusted under 35 U.S.C. 154(b) by 490 days.

(21) Appl. No.: 12/043,928

(22) Filed: Mar. 6, 2008

(65) Prior Publication Data
US 2008/0222083 A1 Sep. 11, 2008

(30) Foreign Application Priority Data
Mar. 9, 2007 (KR) .................. 10-2007-0023302

(51) Int. Cl.
*G06F 17/30* (2006.01)
(52) U.S. Cl. .................. 707/736; 707/921
(58) Field of Classification Search .............. 707/736, 707/921; 705/14.58
See application file for complete search history.

(56) References Cited

U.S. PATENT DOCUMENTS

| | | | |
|---|---|---|---|
| 2007/0150516 A1* | 6/2007 | Morgan et al. | 707/104.1 |
| 2008/0109483 A1* | 5/2008 | Yoo et al. | 707/104.1 |
| 2008/0120311 A1* | 5/2008 | Reed et al. | 707/100 |
| 2008/0129725 A1* | 6/2008 | Stambaugh | 345/419 |
| 2008/0222572 A1* | 9/2008 | Nathan et al. | 715/855 |
| 2008/0307498 A1* | 12/2008 | Johnson et al. | 726/3 |
| 2009/0030774 A1* | 1/2009 | Rothschild et al. | 705/10 |
| 2009/0300528 A1* | 12/2009 | Stambaugh | 715/764 |

FOREIGN PATENT DOCUMENTS
KR 10-0700622 B1 3/2007
* cited by examiner

*Primary Examiner* — Jorge A Casanova
(74) *Attorney, Agent, or Firm* — H. C. Park & Associates, PLC

(57) ABSTRACT

A system and method for generating a unique link (i.e., map permalink) of mash-up map data including various information are provided. The system receives a request for generation of the map permalink of specific mash-up map data, and generates a map URL including map information in response to the request for generation of the map permalink. Also, the system generates at least one of an advertisement layer identifier, an additional service data identifier, and a user-generated data identifier, combines the generated identifier with the map URL, and stores the combined identifier together with related data.

19 Claims, 11 Drawing Sheets

SYSTEM FOR GENERATING PERMALINK OF MASH-UP MAP

CROSS-REFERENCE TO RELATED APPLICATION

This application claims the benefit of Korean Patent Application No. 10-2007-0023302, filed on Mar. 9, 2007, in the Korean Intellectual Property Office, the disclosure of which is incorporated herein by reference.

FIELD OF THE INVENTION

The present disclosure relates to a system for generating a unique link of mash-up map data and a method thereof, and more particularly, to a system and method of generating a unique link capable of requesting mash-up map data, in which various kinds of data are mixed with map data, online.

BACKGROUND OF THE INVENTION

Recently, famous portal sites mostly provide Internet map services. Generally, basic map data for such Internet map services have been produced by the portal sites or expert map production agents. Actually, such Internet maps have been produced and served by Google, Yahoo, Microsoft Corporation, and so forth, and in Korea, many companies have also produced Internet maps.

Map data of a specified area provided by such Internet map services may be stored with a unique link given thereto in order to share and distribute the map data between users. This unique link is referred to as a "permalink". The permalink is a combined word of 'permanent' and 'link', and means an unchangeable address representing an absolute position (e.g., URL) which can be posted on a blog, a bulletin board, an e-mail, and the like, and can be linked to any case.

Generally, an address of contents may designate a file position fixed in a server, or may be in the form of a virtual address which allows a program to bring data stored in a database and display the data on a display screen. Depending on circumstances, this address of contents may be expressed as an address, which only the corresponding program can recognize in order to prevent an illegal copy, without using an actual address, or may be a simpler address such as a Fancy URL. If the expression form of the address is changed, an access to the corresponding contents may sometimes fail. Also, contents whose blog addresses have been changed or contents which have been stored in archives for a long time may not be accessed any further through links provided based on the initial address of contents. However, since the permalink assigns an unchangeable URL to contents itself, the permalink allows it possible to access the original contents even in any case.

FIG. 1 is a diagram explaining a conventional system for providing a map permalink.

A user terminal 10 requests a URL of map data, i.e., a map permalink, for displaying information on an area selected by the user to a map service system 20. The map service system 20 generates and provides a map URL based on regional information contained in the map data.

As described above, the permalink is a unique URL of the map data, and thus even if the user terminal 10 distributes the map URL to other user terminals 11 and 12, the other user terminals 11 and 12 can use the map data which was displayed on the user terminal 10. Although FIG. 1 shows that the map URL is directly provided to other user terminals 11 and 12, the map URL may also be provided through other paths such as a blog, a bulletin board, and the like FIG. 2 is a diagram showing an information structure of a conventional map permalink.

The conventional map permalink generally includes a server address a1, a map number a2, a coordinate number a3, a storage number a4, and a point identifier a5.

The server address a1 indicates an address of a server of a company that provides a map service. For example, the server address may be "www.local.live.com" of Microsoft Corporation or "www.maps.yahoo.com" of Yahoo.

The map number a2 may include a map number assigned to map data by a map service providing agent. In case of a famous area that can be marked on the map data as a landmark, an identifier can be assigned thereto. The point identifier a5 may be used instead of the map number a2, or may be used together with the map number.

Coordinate information of a reference point of the displayed area may be assigned to the coordinate number a3. The coordinate number a3 may be a coordinate value uniquely assigned by the map service providing agent in consideration of the whole map data, or may be a coordinate value used in a universal coordinate system using a latitude and a longitude.

The storage number a4 is the number capable of identifying or counting the stored permalinks, and may be generated in accordance with design specifications of a permalink providing system.

The map permalink may be generated in the form of URLs that can be universally used online. By way of example, permalinks generated for Battery Park in New York City by using map service systems of Microsoft Corporation, Yahoo, and Google, respectively, are given as follows. local.live-.com/default.aspx?v=2&cp=40.705633.about.-74.01745-7&style=h&lvl=19&tilt-90&dir=0&alt=-1000&scene=1484707
maps.yahoo.com#tp=1&tt=battery%20park%20new%20york&mvt=s&tr-f=0&1on
-74.017339&lat=40.705734&mag=1 maps.google.com/maps?f=q&hl=en&q=new+york+battery+park&ie=UT-F8&z=19&11=40. 705183,-74.017127-&spn=0.001383, 0.002849&t=k&om=1

As can be seen from the above example, although the permalink may selectively include additional information on such as a font or unicode, it can be understood that the permalink is generated by adding a point identifier and a coordinate number respectively distinguished by its own delimiter to the URL corresponding to a server address in a similar manner to the example structure shown in FIG. 2.

However, the conventional permalink as described above is provided in a state that it only includes information on a map itself.

Recently, the map data service has been gradually developed to provide additional services such as a path search service, a shortest path search service, and the like. In addition, the map data service performs a local advertisement by displaying an advertisement of a specific company on map data or displaying a bargain sale notice or events of an advertiser. Further, the map data service provides a service which allows a user to add user-generated data to a map by directly inputting a picture or text on the map by using a graphic tool provided on a web site.

As described above, although "mash-up" map services capable of mixing various information with map data have been provided, a permalink of a mash-up map including various information cannot be provided in accordance with the prior art. That is, it is only possible to store an image of a mash-up map in the form of a file and to transmit the mash-up map image only to limited users.

That is, although the map service has been developed to include various additional service information, advertisements and user-generated information, no algorithm for generating the permalink of the mash-up map has been provided yet in accordance with the prior art.

Due to the above-described problems, the prior art cannot sufficiently take advantage of the permalink capable of indicating the mash-up map data regardless of users or locations.

BRIEF SUMMARY OF THE INVENTION

In view of the foregoing, the present disclosure provides a system and method for generating a permalink of mash-up map data including various information.

The present disclosure also provides a system and method for immediately generating a permalink of a mash-up map when a user wishes to generate.

The present disclosure also provides a system and method for generating a permalink of mash-up map data providing a real-time feature of additional service data added to map data.

The present disclosure also provides a system and method for generating a permalink of mash-up map data which can be used in a blog, a messenger, an e-mail, or other means, and can be used as a means of viral marketing.

In accordance with a first aspect of the present invention, there is provided a system for generating a map permalink including: a map permalink generation unit configured for generating at least one identifier of map information and at least one identifier of information associated with geographic location, and for generating a map permalink of mash-up map data by using the generated identifiers and at least one delimiter; a map permalink storage unit for storing the generated map permalink and data related to the map permalink; and a map permalink providing unit configured for providing the map permalink or the mash-up map data corresponding to the map permalink in response to a request received from a user. The identifiers are distinguished from each other by the delimiter. The mash-up map data include a base map layer for the map information and a upper map layer for the information associated with geographic location.

The sub-layers of the upper map layer include at least one of an advertisement layer, an additional service layer, and a user-generated data layer.

Further, the map permalink generation unit includes: a map URL generation engine for generating a map URL of the base map layer; and at least one of an advertisement layer identifier generation engine for generating an identifier of the advertisement layer, an additional service data identifier generation engine for generating an identifier of the additional service layer, and a user-generated data identifier generation engine for generating an identifier of the user-generated data layer.

In accordance with a second aspect of the present invention, there is provided a method for generating a map permalink of mash-up map data, including: generating a first universal resource locator (URL) in response to a request for a map permalink from a user; generating at least one identifier; generating a map permalink by combining the first URL and the at least one identifier; and providing the generated map permalink to the user. The first URL includes map information. The at least one identifier is indicative of information associated with geographic location.

The map permalink may be in the form of URL, and the identifier may be distinguished by a delimiter and then added to the map URL.

Further, the request for the generation of the map permalink may be provided through a hot key on a web page, and the hot key may be displayed together with the mash-up map data.

In accordance with a third aspect of the present invention, there is provided a method of providing mash-up map data by using a map permalink including: retrieving a map permalink corresponding to mash-up map data; determining whether external additional service data are required by analyzing the retrieved map permalink; requesting the external additional service data if the external additional service data are required; and providing the mash-up map data by combining the external additional service data and data associated with the map permalink. The mash-up data combine a base map layer and at least one additional service layer. The base map layer includes map information and the at least one additional service layer includes additional service data. The map permalink includes an external additional service data identifier if external additional service data are required.

In accordance with a forth aspect of the present invention, there is provided a computer-readable recording medium storing a data structure including: a map URL structure including a server address, a map image number, X, Y coordinates of a map image, a zoom level, spot coordinates for indicating a specific point, and area coordinates for indicating a specific area; and an upper map layer structure including at least one of an advertisement layer identifier, an additional service data identifier, and user-generated data identifier, the identifiers being distinguished by delimiters.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
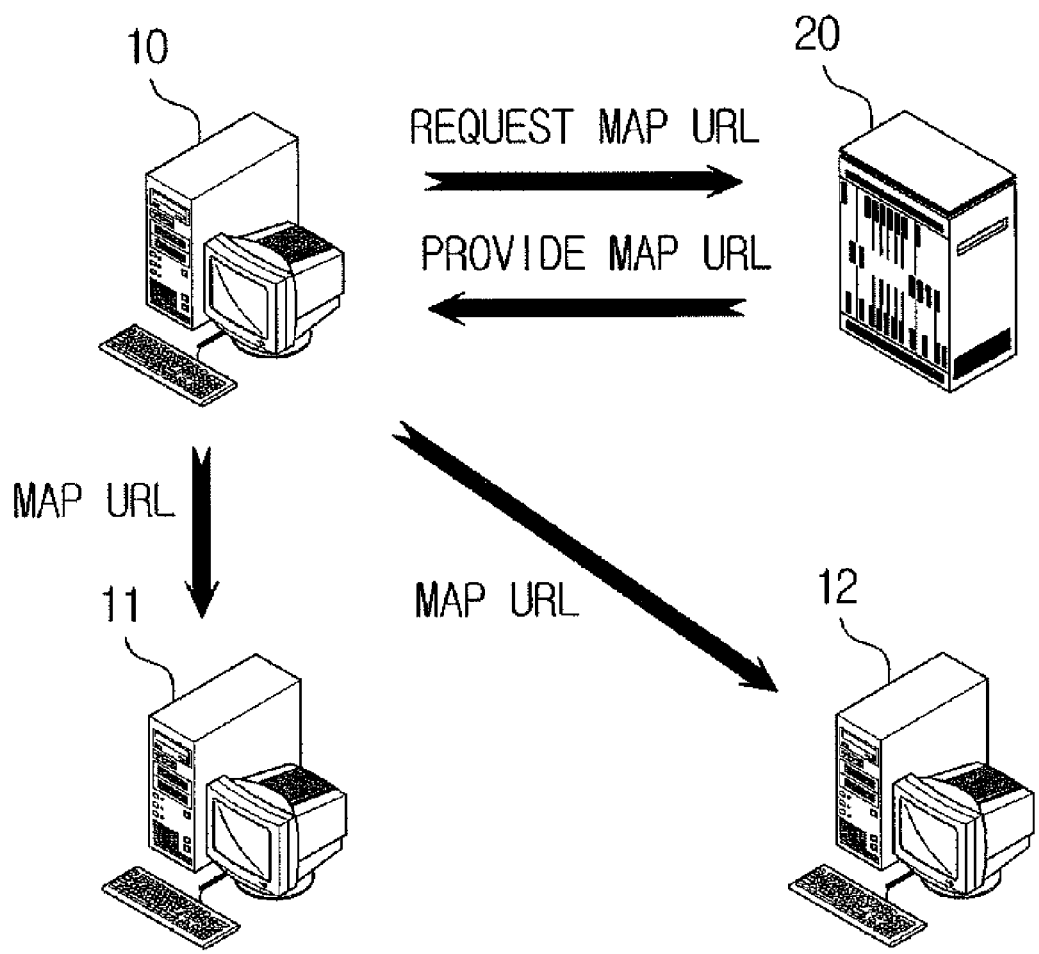
FIG. 1 is a diagram explaining a conventional system for providing map permalink.
Figure 2:
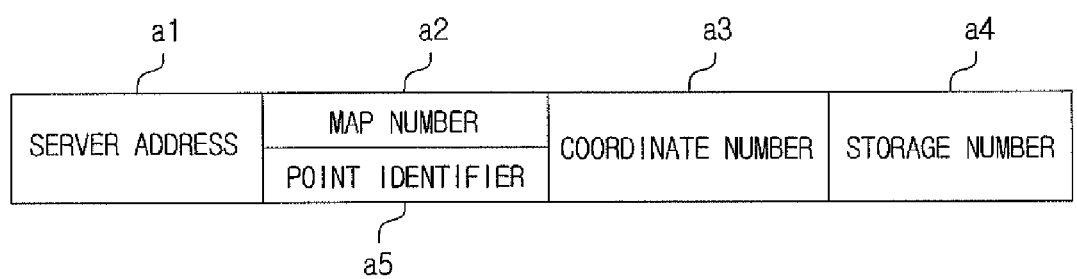
FIG. 2 is a diagram showing an information structure of a conventional map permalink.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 3:
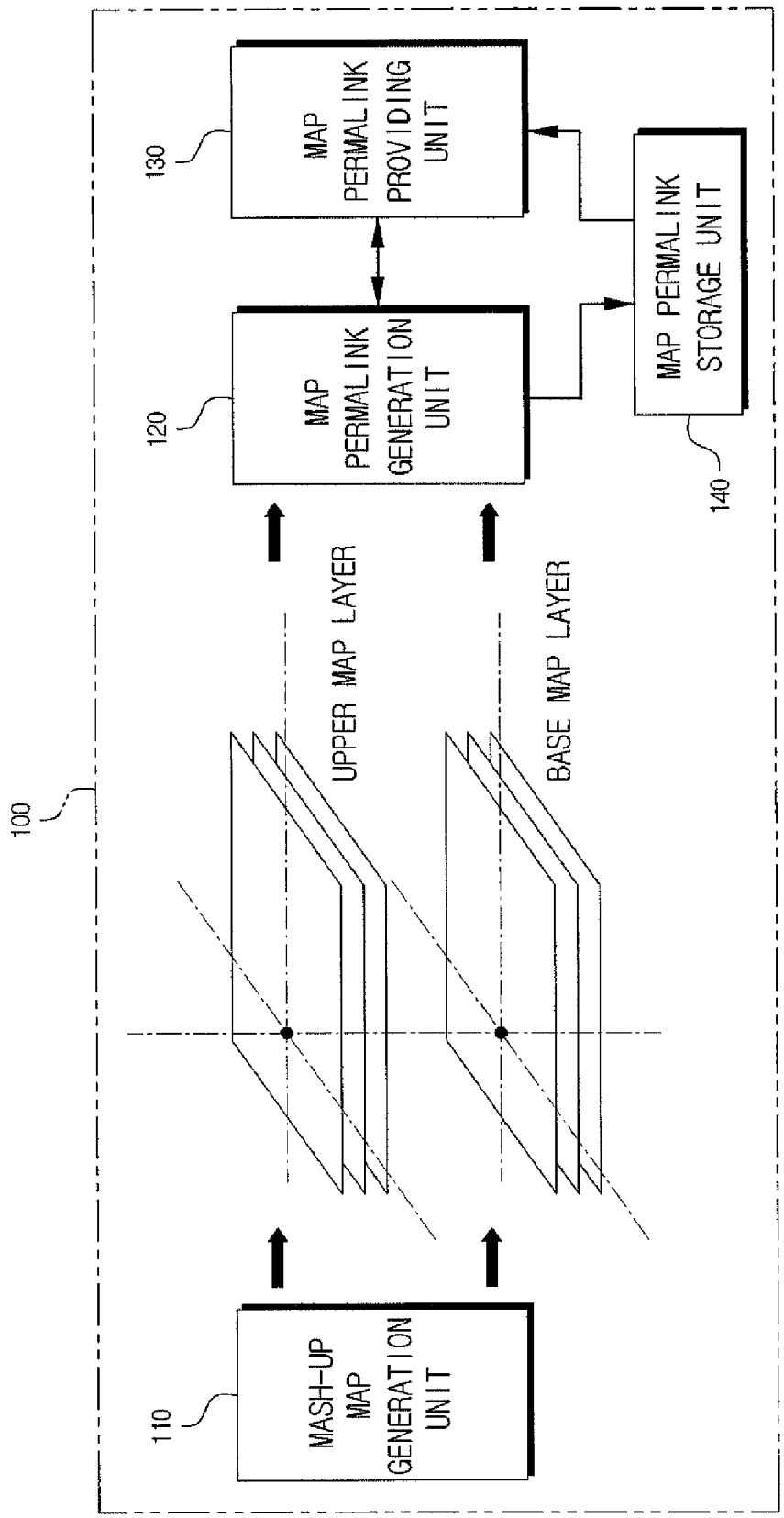
FIG. 3 is a block diagram showing a schematic configuration of a system for generating a map permalink in accordance with an embodiment of the present invention.

FIG. 3 is a block diagram showing a schematic configuration of a system for generating a map permalink in accordance with an embodiment of the present invention.

The system 100 for generating a map permalink in accordance with an embodiment of the present invention includes a mash-up map generation unit 110, a map permalink generation unit 120, a map permalink providing unit 130, and a map permalink storage unit 140.

The mash-up map generation unit 110 generates a mash-up map by mixing an upper map layer including additional information with a base map layer including basic map data. The upper map layer may be divided into a plurality of sub-layers. In one embodiment, the upper map layer may include an advertisement layer including local advertisement information, an additional service layer capable of providing a path search function, a shortest path search function, or a 3-dimensional (3D) object, and a user-generated data layer including data generated by a user through the use of an input tool. It would be appreciated by those skilled in the art that various information associated with the geographic location may fall within the upper map layer.

As shown in FIG. 3, since the upper map layer including at least one sub-layer is disposed on the base map layer and is displayed with the base map layer on a web site, a user can use the mash-up map data including various kinds of information disposed on the basic geographical information.

The map permalink generation unit 120 generates a permalink of the mash-up map in response to a user's request for a map permalink generation. The map permalink generation unit 120 generates an identifier corresponding to information or data having been used in the mash-up map generation unit, and generates a map permalink by inserting the identifier for each delimiter of a URL. Here, the term "identifier" denotes an element of the map permalink, which identifies an information element used for generating the mash-up map or link information.

The respective identifier may employ different form or format. The configuration of a map permalink and a detailed generation algorithm in accordance with an embodiment of the present invention will be described later.

The map permalink providing unit 130 provides the map permalink generated by the map permalink generation unit 120 to a user terminal. Since the map permalink is generated in a form of URL, the map permalink providing unit 130 may provide a function of copying a text corresponding to the URL. Also, the map permalink providing unit 130 requests related data of the stored map permalink.

The map permalink storage unit 140 stores the map permalink generated by the map permalink generation unit 120 and mash-up map data corresponding to the map permalink. If a query for the map permalink is received by the map permalink providing unit 130, the map permalink storage unit 140 requests and provides the mash-up map data corresponding to the map permalink. Accordingly, it is possible to transmit the map mash-up data corresponding to the permalink queried from a blog, an e-mail or a messenger, so that the user can freely post the mash-up map data online by using the permalink.

Figure 4:
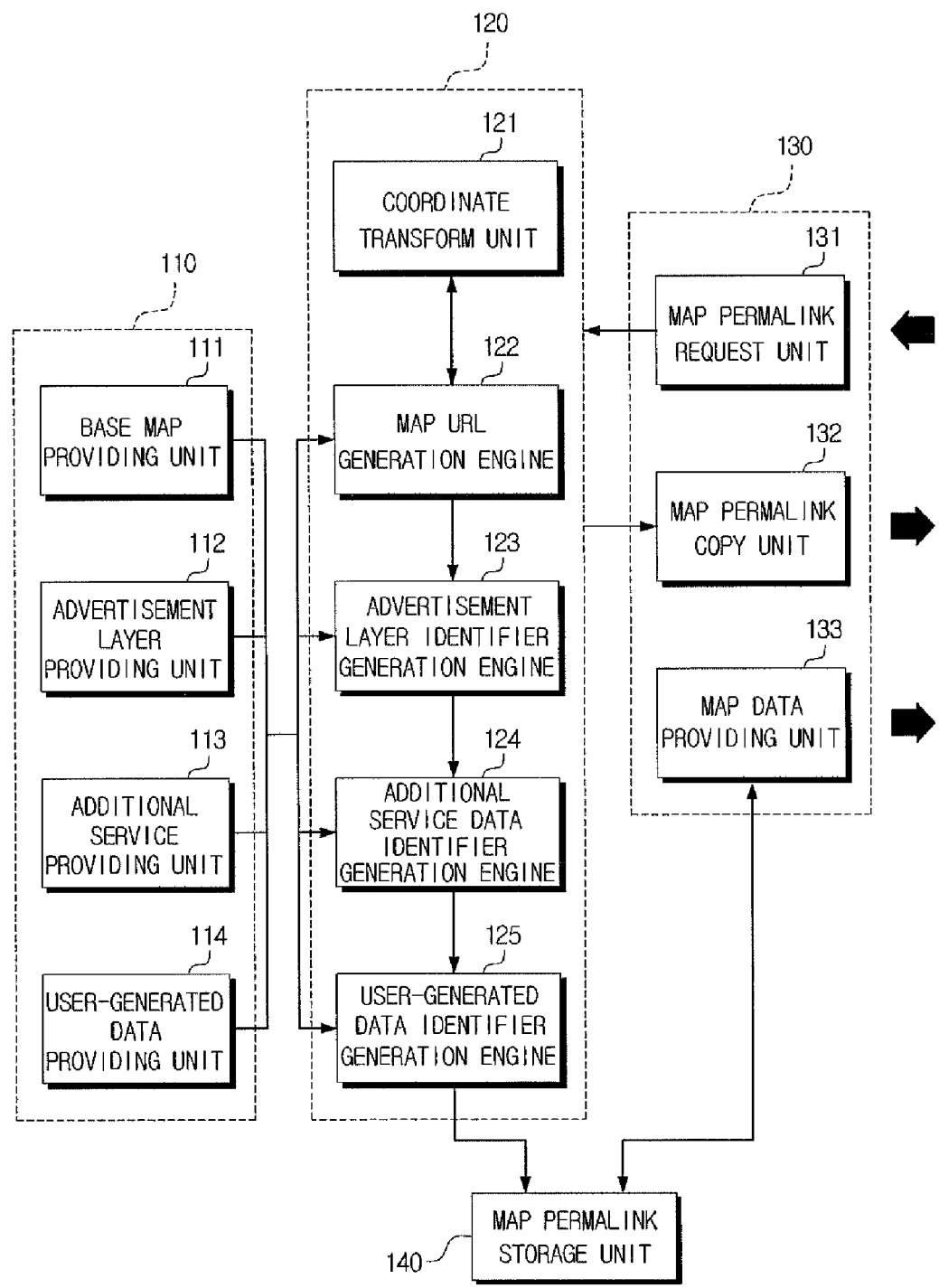
FIG. 4 is a block diagram showing a detailed configuration of a system for generating a map permalink in accordance with an embodiment of the present invention.

FIG. 4 is a block diagram showing a detailed configuration of a system for generating a map permalink in accordance with an embodiment of the present invention.

The mash-up map generation unit 110 includes a base map providing unit 111, an advertisement layer providing unit 112, an additional service providing unit 113, and a user-generated data providing unit 114.

The base map providing unit 111 provides base map layer data for providing geographical information. The base map layer data are divided into a plurality of partition maps, each having a specific size, and the plurality of partition maps are stored. The partition map is divided again into a number of partial area information, each having a smaller size than that of the partition map, and an identifier is assigned to each partial area information. If a POI (Point Of Interest) is designated, the partial area information around the POI may be gathered to generate single map data.

The advertisement layer providing unit 112 provides information on a specific advertisement related to the geographical information. The advertisement information may be generated based on an advertiser's request, and may be displayed on the advertisement layer disposed on the base map layer.

The additional service providing unit 113 provides various additional services based on the geographical information. The additional services may include a path search service, a shortest path search service, a minimum time path search service, a bus route search service, a 3D display service of buildings, and the like. The additional service may also be displayed on an additional service data layer disposed on the base map layer. Although the additional services can be provided by a map data service system, some additional services such as a minimum time path search service depending on road traffic conditions, and the like, may be provided by an external system.

The user-generated data providing unit 114 provides a tool through which a user can input text on the map, put a mark or draw a simple image. The user-generated data may also be displayed on a user-generated data layer disposed on the base map layer.

As described above, since the advertisement layer, the additional service data layer and the user-generated data layer are disposed on the base map layer, they will be referred to as upper map layers in the following description of the present invention. It is not necessary to designate the orders of the sub-layers of the upper map layer, and proper orders may be assigned thereto in accordance with user's convenience.

The map permalink generation unit 120 includes a coordinate transform unit 121, a map URL generation engine 122, an advertisement layer identifier generation engine 123, an additional service data identifier generation unit 124, and a user-generated data identifier generation engine 125.

The map URL generation engine 122 generates a map URL related to the base map for displaying the geographical information. The coordinate transform unit 121 transforms coordinate values of a first coordinate system into coordinate values of a second coordinate system when the map URL generation engine 122 generates the map URL.

The advertisement layer identifier generation unit 123 may generate an identifier for indicating an advertiser, advertisement contents data, an advertisement billing method, and the like, based on the data contained in the advertisement layer. However, if advertisement layer data are not present in the mash-up map data or the user wishes removal of the advertisement layer data, the advertisement layer identifier generation engine 123 may not operate.

The additional service data identifier generation engine 124 generates an identifier for indicating information on the additional services generated on the base map. For example, the path search service may provide information on a departure point, a via-point, and a destination point. Also, in case of using an external additional service, an identifier capable of requesting external additional service data is generated.

The user-generated data identifier generation engine 125 generates an identifier related to a text or an image inputted on the map by the user. The user-generated data may be generated based on an XML (eXtensible Markup Language), and the user-generated data identifier may include XML server hyperlink information.

The map permalink generation unit 120 generates the map permalink in the form of URL by combining the map URL with the identifiers of the upper map layers. The map permalink is stored in the map permalink storage unit 140 together with the corresponding mash-up map data.

The map permalink providing unit 130 includes a map permalink request unit 131, a map permalink copy unit 132, and a map data providing unit 133.

The map permalink request unit 131 requests the map permalink generation unit 120 to generate the permalink in response to a command received from a user terminal using mash-up map data. The map permalink generation unit 120, upon receiving the request, generates the permalink in the form of URL by combining information elements capable of identifying the mash-up map data by respective layers. The map permalink request unit 131 provides a request input interface to a web page together with the mash-up map data, and if a request is inputted through the request input interface, the map permalink request unit 131 requests a permalink generation based on the mash-up map data being presently displayed.

The map permalink copy unit 132 supports copying of text data of the generated map permalink. This copying can be easily carried out by using a copy function provided by an operating system such as Windows.

The map data providing unit 133 requests and provides the mash-up map data stored in the map permalink storage unit 140 by using the map permalink received from an outside. As described above, since the map permalink is provided in the form of URL, the above-described operation can be performed by a data request using the URL.

Figure 5:
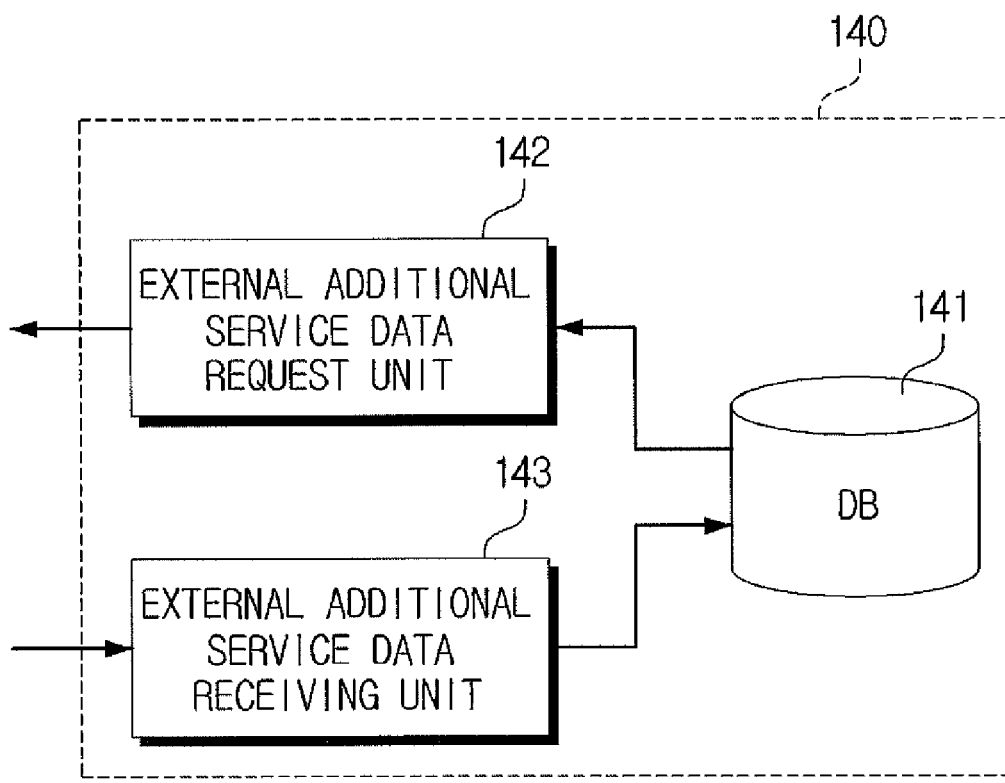
FIG. 5 is a block diagram showing a detailed configuration of a map permalink storage unit in accordance with an embodiment of the present invention.

FIG. 5 is a block diagram showing a detailed configuration of a map permalink storage unit 140 in accordance with an embodiment of the present invention.

The map permalink storage unit 141 includes a map permalink database 141, an external additional service data request unit 142, and an external additional service data receiving unit 143.

In the map permalink database 141, the map permalink and the corresponding mash-up map data are stored. Accordingly, if the map permalink is transmitted online, the mash-up map data corresponding to the map permalink are searched and provided.

Meanwhile, the additional service layer may include additional services provided by an external server. For example, a service such as a shortest time path search service in consideration of traffics may be included in the additional service layer. In case that the map permalink includes an identifier related to such external additional service, the external additional service data request unit 142 requests data of the additional service layer to an external server providing the corresponding external additional service. The presence of the external additional service can be easily checked by using delimiters for distinguishing the identifiers by respective layers in the map permalink.

The external additional service data receiving unit 143 receives the external additional service data in response to the request of the external additional service data request unit 142, and adds the received external additional service data to the stored mash-up map data. When the map permalink for the mash-up map data is generated, required basic information (e.g., a departure point and a destination point) has been inputted to an external additional service providing server. Therefore, the corresponding additional service data can be provided by transmitting the identifier assigned to the additional service data. On the other hand, the additional service data can be received by transmitting the basic information in a compatible format to the external additional service providing server.

In the embodiment of the present invention, the user-generated data and the additional service data have been explained separately. However, if the user-generated data service is provided by an external server, it will be apparent to those skilled in the art that the embodiment as illustrated in FIG. 5 can be applied as it is.

Figure 6:
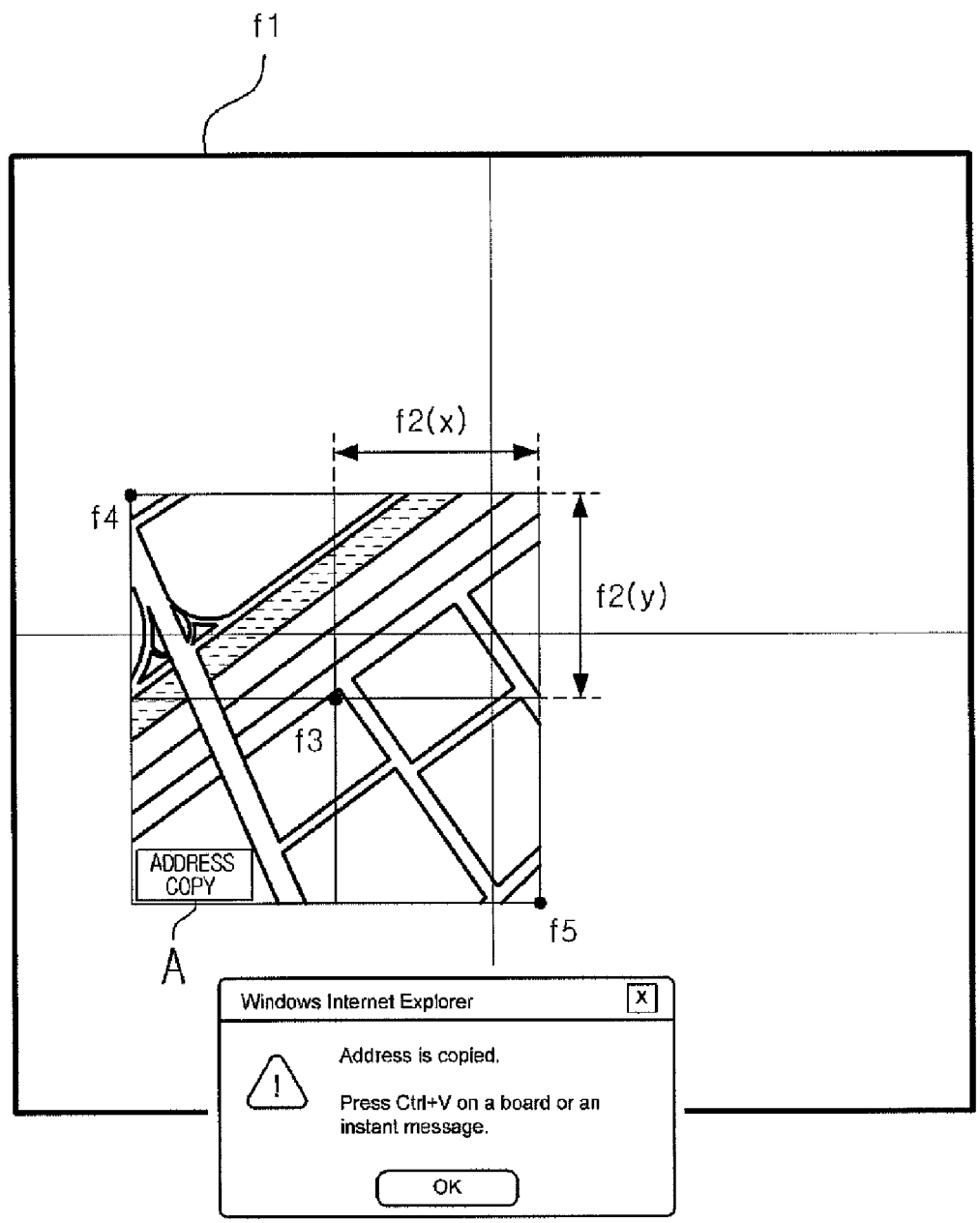
FIG. 6 is a diagram explaining a map URL configuration of a map permalink in accordance with an embodiment of the present invention.

FIG. 6 is a diagram explaining a map URL configuration of a map permalink in accordance with an embodiment of the present invention.

The map data displayed to the user includes base map images. In an example as shown in FIG. 6, four base map images are used, and an information element f1 indicates the base map image number. The information element f1 may include a zoom level.

An information element f2 and an information element f3 indicate a center point (i.e., spot) of a selected map. The information element f3 means the coordinates of the center point, and information element f2 may mean X, Y coordinates in accordance with the size of the map picture, or may be used as general coordinates usable in a GPS and the like.

An information element f4 and an information element f5 display an area of the map data. In case that an aspect ratio of the map is fixed, the display area can be calculated by using the coordinate values of the information element f4 and the information element f5.

In the embodiment of the present invention, Bessel coordinates system or WGS84 coordinate system may be used, and the used coordinate system can be transformed into another coordinate system by the coordinate transform unit 121 for the compatibility with another device or system.

Table 1 below describes the configuration of the map URL in accordance with an embodiment of the present invention.

TABLE 1

| Information Element | Example |
| --- | --- |
| Server Address | maps.naver.com |
| Map Image Number | mn★★★ |
| X, Y Coordinates of Map Image | X★★★~Y★★★ |
| Zoom Level Number | zl★★ |
| Spot Coordinates | csbsxla★★★★★★★★csbsylo ★★★★★★★★ |
| Area Coordinates | ralusbsxla★★★★★★★★ rardsbsylo ★★★★★★★★ raluswgsxn★★★★★★★★rardswgsye ★★★★★★★★ |

In Table 1, "★" corresponds to a specific numerical value or a specific character, and after the server address, respective information elements may be divided by using delimeters such as "mn", "csbszla", "csbsylo", and the like.

A button A in FIG. 6 denotes a hot key capable of copying the map permalink of the map data being presently displayed, and this hot key is implemented on the web page together with the map data. A common term, a hot key, is used when a user wishes to cause a communication terminal to immediately perform a desired function or display desired menu items. By using the hot key A, the user can copy text of the map permalink of the mash-up map data on which desired information is displayed, and can paste the copied map permalink text on a desired web site.

Figure 7:
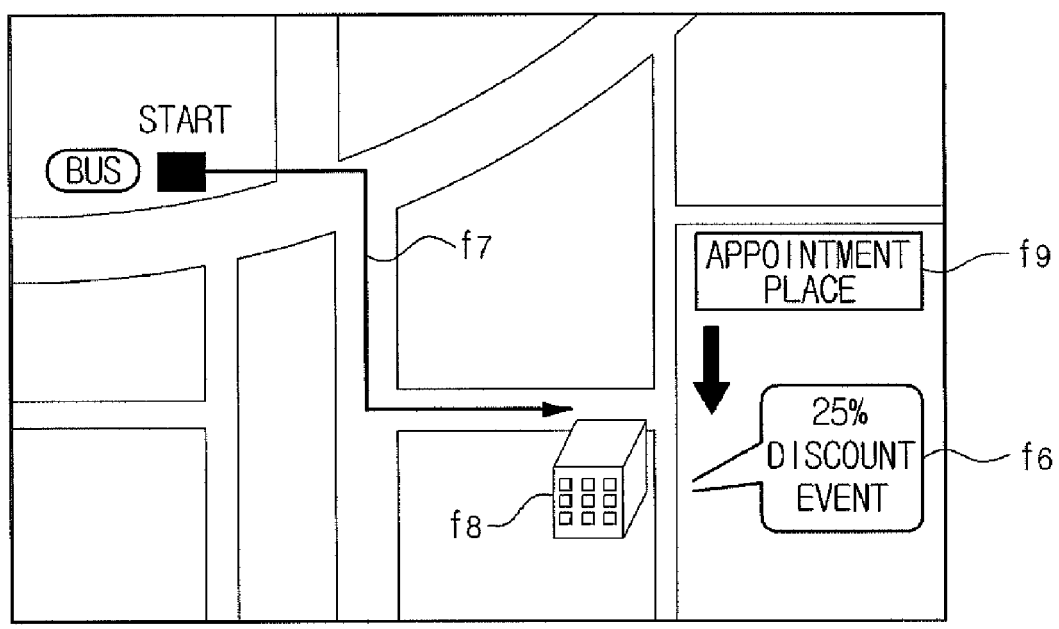
FIG. 7 is a diagram explaining a configuration of upper map layer information of a map permalink in accordance with an embodiment of the present invention.

FIG. 7 is a diagram explaining a configuration of upper map layer information of a map permalink in accordance with an embodiment of the present invention.

FIG. 7 shows an example scene including various information of the upper map layer displayed on the map data corresponding to the base map layer.

An information element f6 is an identifier of an advertisement layer including an advertisement for a specific company displayed on the map.

An information element f7 is an identifier for identifying a path search additional service if the path search additional service is used. For example, in case of using the path search additional service by inputting a departure point and a destination point, time, departure coordinates, destination coordinates, the number of via-points, via-point coordinates, and the like may be used as the information element.

An information element f8 is an identifier for identifying a 3D map additional service in case of using the 3D map additional service. In the 3D map service, a slope and a height may be used as the information element.

An information element f9 is an identifier for displaying user-generated data generated by inputting a text or an image on the map. In the user-generated data, XML hyperlink information connected to the map may be used as the information element.

Table 2 below shows an example of the configuration of the upper map layer information.

TABLE 2

| Information Element | Example |
| --- | --- |
| Advertisement Field | adid★★★★★★ |
| Additional Service Field | Df200107134516s★★★★★★v5e★★ ★★★★ Af~◎★★★◎◎★ |
| User Generation Data Field | nml~◎★★★◎◎★ |

As shown in Table 2, the upper map layer information is configured so as to input proper values ★ with respect to the delimiters corresponding to the respective information elements.

In the advertisement field, the advertisement layer identifier can be inputted by using a delimiter 'adid', and the additional service field may include time, departure coordinates, the number of via-points v5e, and destination coordinates. The additional service field may further include various XML hyperlink information, which can be associated with other servers by using a delimiter 'Af'. Further, the user-generated data field may include XML hyperlink information for linking the text or image information inputted by a user by using the delimiter 'nml'.

As described above, in the embodiment of the present invention, information elements having been explained with reference to Table 1 and Table 2 are combined in the form of URL, and thus the map permalink for displaying various information of the mash-up map data can be generated.

The delimiters or URL forms as described above in accordance with the embodiments of the present invention are only examples, and it will be apparent that any selective configurations without departing from the purpose of the present invention belong to the scope of the present invention.

Figure 8:
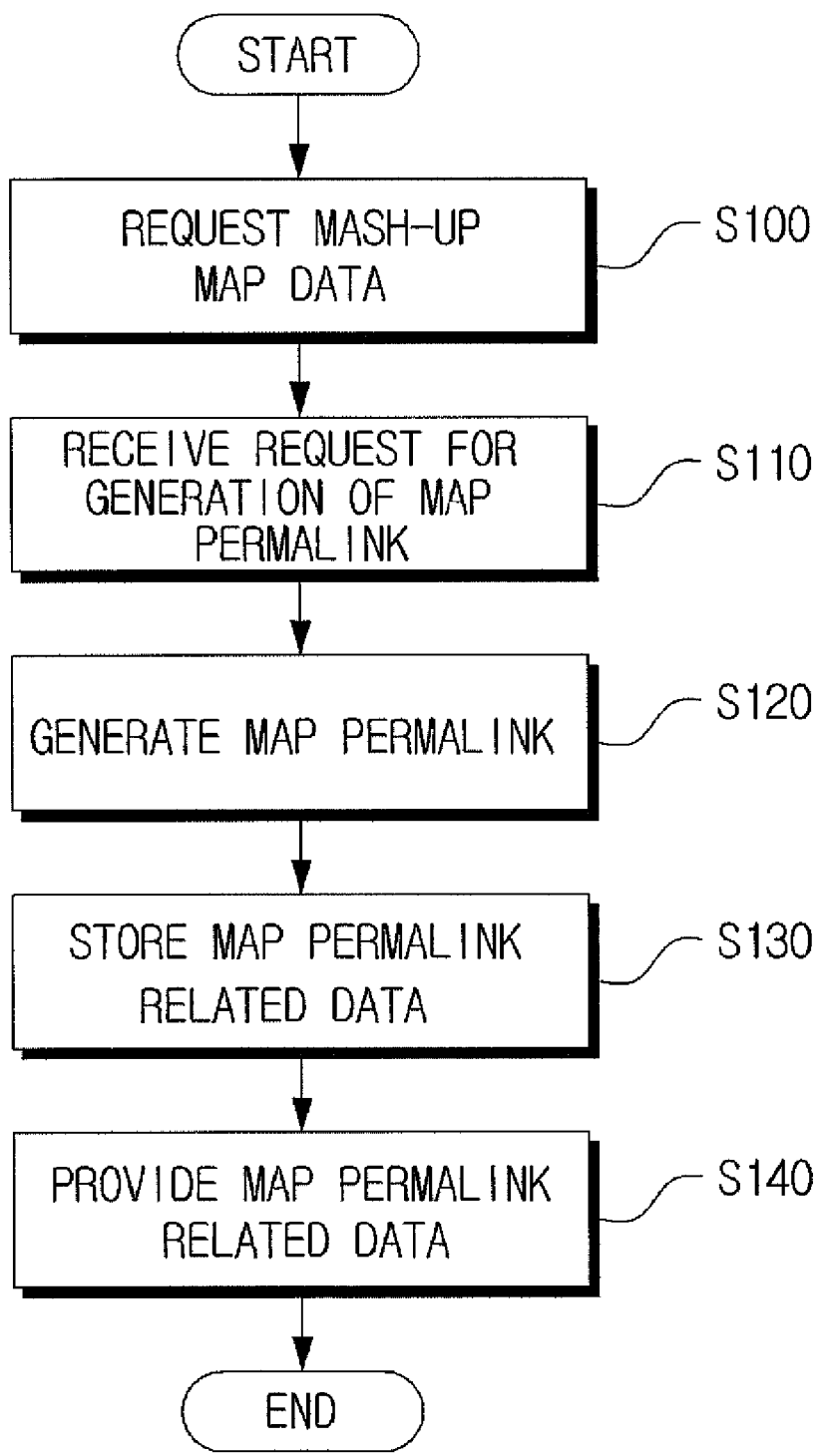
FIG. 8 is a flowchart for explaining a method of generating a map permalink in accordance with an embodiment of the present invention.

FIG. 8 is a flowchart for explaining a method of generating a map permalink in accordance with an embodiment of the present invention.

At step S100, the mash-up map generation unit 110 requests the generated mash-up map data in response to a user's map information search. As described above, the mash-up map data are generated in a manner that the upper map layer having various information is disposed on the base map layer having the map information.

The mash-up map data are displayed on the web page accessible by the user terminal. The user terminal can request the map permalink of the mash-up map data by using a hot key and the like provided together with the mash-up map data. When the generation of the map permalink is requested, the map permalink generation system receives the request (step S110).

In response to the request for the map permalink generation, the map permalink generation unit 120 generates the map permalink. The map permalink may be generated in the form of URL by combining the identifiers for displaying the information elements which the base map layer of the mash-up map data and the respective sub-layers of the upper map layer have. The identifiers may be distinguished by the delimiters for distinguishing the respective information elements and may have various formats.

If the map permalink is generated, the map permalink related data are stored in the map permalink storage unit 140 (step S130). The map permalink related data include the mash-up map data corresponding to the map permalink.

If the mash-up map data are requested through the stored map permalink, the stored map permalink related data are provided (step S140). If there is not additional service layer including the external additional service, only the stored mash-up map data are provided. If there is an additional service layer, the external additional service data are received and mixed with the stored permalink related data, so that the mixed data are provided as the mash-up map data.

Figure 9:
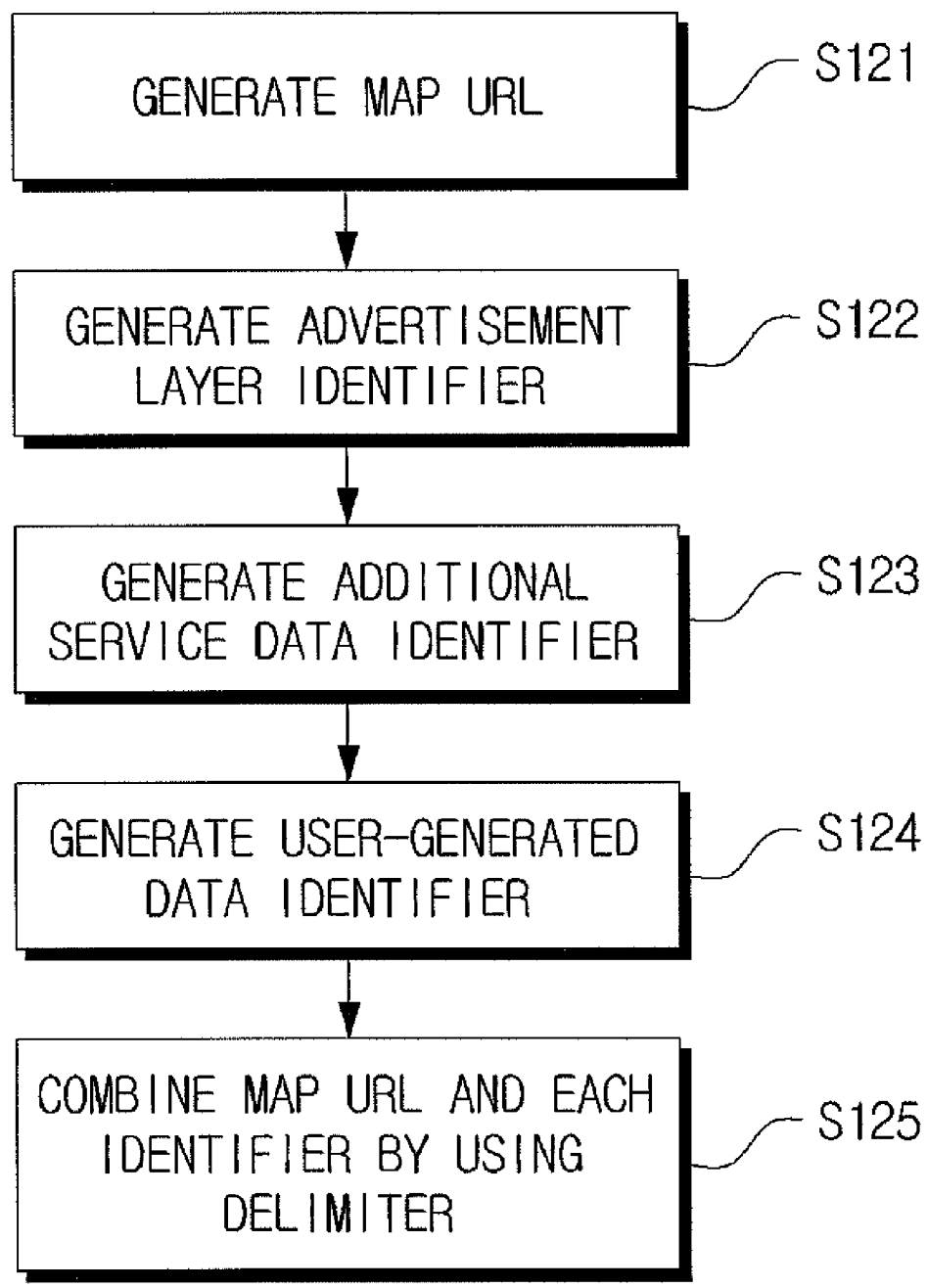
FIG. 9 is a flowchart for explaining a step of generating a map permalink according to an embodiment of the present invention.

FIG. 9 is a flowchart for explaining a step of generating a map permalink in accordance with an embodiment of the present invention.

If the map permalink generation is requested, the map URL including the map information is generated (step S121). In the embodiment of the present invention, the information elements of the map URL may include a server address, a map image number, X, Y coordinates of a map image, spot coordinates, and area coordinates.

At steps S122, S123, and S124, the advertisement layer identifier, the additional service data identifier, and the user-generated data identifier are generated. These identifiers are identifiers for displaying the advertisement information, the additional service data, and the user-generated data, and may be inserted after the delimiters, respectively, in various formats. Since the details thereof have been described in the embodiment related to FIG. 7 and Table 2, the detailed description thereof will be omitted.

In FIG. 9, it is not necessary for the steps S121 to S124 to be performed in sequence. The generated map URL, the advertisement layer identifier, the additional service data identifier, and the user-generated data identifier are distinguished by the respective delimiters, and then combined as one permalink.

Figure 10:
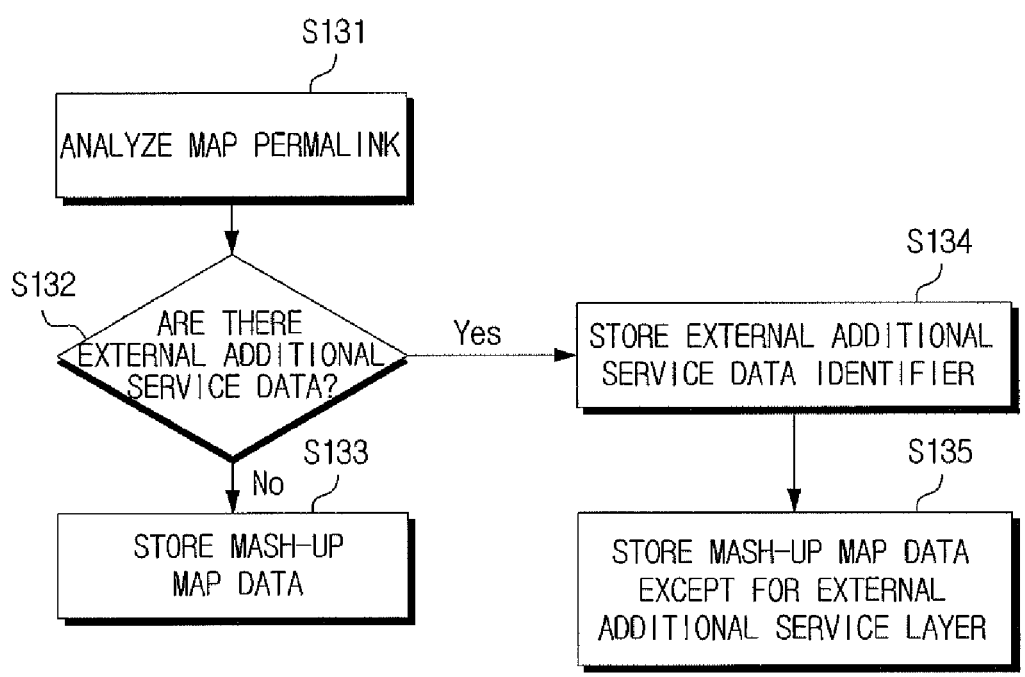
FIG. 10 is a flowchart for explaining a step of storing map permalink related data in accordance with an embodiment of the present invention.

FIG. 10 is a flowchart for explaining a step of storing map permalink related data in accordance with an embodiment of the present invention.

Before storing the generated map permalink, the information elements of the map permalink are analyzed (step S131). Since the information elements of the map permalink are distinguished by the delimiters, the analysis of the permalink becomes possible by analyzing the information elements assigned to the respective delimiters.

At step S132, it is determined whether external additional service data are present or not in the analyzed permalink. As described above, if the information element after the delimiter for distinguishing the additional service is required to receive data from an outside server, it is determined that there are the external additional service data. For example, the additional service related to the minimum time path includes the identifier for bring the related data, and in this case, it is determined that there are the external additional service.

If there are not external addition service data, the mash-up map data are stored (step S133).

However, if there are the external additional service data, the external additional service data identifier is stored (step S134). The external additional service data identifier may be separately stored, or the whole map permalink may be stored.

At step S135, the mash-up map data excluding the external additional service layer are stored. The excluded external additional service layer may be mixed with the stored mash-up map data later.

Figure 11:
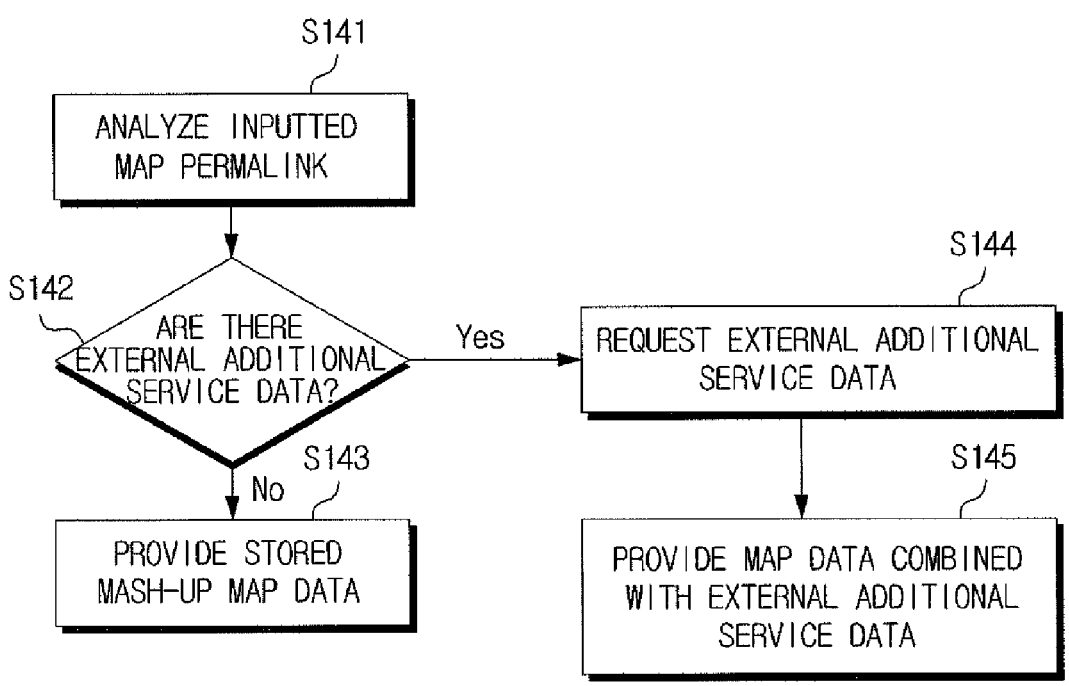
FIG. 11 is a flowchart for explaining a step of providing map permalink related data in accordance with an embodiment of the present invention.

FIG. 11 is a flowchart for explaining a step of providing map permalink related data in accordance with an embodiment of the present invention.

If the map permalink for requesting the map mash-up data is inputted, the inputted map permalink is analyzed at step S141. As described above, since the map permalink is in the form of URL and has delimiters and information elements related to the respective delimiters, it is possible to analyze the information elements.

At step S142, it is determined whether the external additional service data are present in the analyzed permalink. As described above, if the information element after the delimiter for distinguishing the additional services is required to bring the data from an outside server, it is determined there exist the external additional service data.

If no external addition service data exist, the mash-up map data corresponding to the map permalink are provided to the source that has transmitted the map permalink (step S143).

However, if the external additional service data exist, the corresponding external additional service data are requested (step S144). For example, if the identifier of the external additional service data is XML hyperlink information, the external additional service data are requested by using the corresponding XML hyperlink.

At step S145, new mash-up map data are provided by combining the external additional service data, transmitted in response to the request, and the stored mash-up map data. Through this configuration, even if the constituent elements constituting the mash-up map data have been generated by another entity, the desired mash-up map data can be provided. Also, even if the mash-up map data request real-time data that depend on the present time, the mash-up map data that meet the request can be provided.

While various functional components have been described in the embodiments of the present disclosure, it should be appreciated the embodiments can be implemented in hardware, software, firmware, middleware or a combination thereof and utilized in systems, subsystems, components, or sub-components thereof. When implemented in software, the elements of the embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, and the like).

Through the above-described configuration according to the present invention, the map permalink capable of including various information, such as an advertisement of the mash-up map data, the additional service, the user-generated data, and the like, can be generated.

In addition, by using the hot key for supporting the copy of the map permalink, the permalink of the mash-up map can be immediately generated when the user wishes to generate the permalink during the generation process of the mash-up map data.

Further, even if the additional service data included in the mash-up map data are generated by another entity, the data can be provided through the map permalink, and even in case of the time-dependent data, the real-time data can be ensured.

Furthermore, since various information except for the map information can be extended to blogs, messengers, mails, and other devices, the permalink can be used as an effective tool of viral marketing using the mash-up map data.

While various functional components have been described in the embodiments of the present disclosure, it should be appreciated the embodiments can be implemented in hardware, software, firmware, middleware or a combination thereof and utilized in systems, subsystems, components, or sub-components thereof. When implemented in software, the elements of the embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, and the like). As used in this application, the terms "unit" and "system" are intended to refer to a computer-related entity, either hardware, a combination of hardware and software, software, or software in execution. For example, a unit can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a unit. One or more units can reside within a process and/or thread of execution, and a unit can be localized on one computer and/or distributed between two or more computers.

The scope of the present invention is defined by the following claims rather than by the detailed description of the embodiment. It shall be understood that all modifications and embodiments conceived from the meaning and scope of the claims and their equivalents are included in the scope of the present invention.

The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system comprising a server comprising a processor, a memory and an executable program code configured to cause to generate a permalink of mash-up map data comprising a base map layer for map information and an upper map layer for additional information associated with a geographic location, the system comprising:
   means for generating one or more identifiers and delimiters corresponding to the map information and the additional information associated with a geographic location to generate the permalink of mash-up map data, the generated identifiers and delimiters comprise information for hyperlinking the additional information on the base map, wherein the permalink of mash-up map data comprises a Uniform Resource Locator (URL) which comprises the generated identifiers and delimiters as hyperlink address corresponding to the URL to display the mash-up map data;
   means for storing the permalink and the mash-up map data corresponding to the permalink; and
   means for providing the permalink corresponding to the mash-up map data in the form of the URL in response to receipt of a user request.

2. The system of claim 1, wherein the upper map layer comprises at least one sub-layer, the sub-layer comprising one of an advertisement layer, an additional service layer, a user-generated data layer, or any combinations thereof.

3. The system of claim 2, further comprising:
   a map URL generation engine to generate a map URL of the base map layer;
   an advertisement layer identifier generation engine to generate an identifier of the advertisement layer;
   an additional service data identifier generation engine to generate an identifier of the additional service layer; and
   a user-generated data identifier generation engine to generate an identifier of the user-generated data layer.

4. The system of claim 3, further comprising:
   a map permalink request unit configured to request generation of the permalink in response to the request of the user;
   a map permalink copy unit configured to provide a copy function of text information of the generated permalink; and
   a map data providing unit configured to provide mash-up map data corresponding to the permalink.

5. The system of claim 3, further comprising:
   a coordinate transform unit configured to convert coordinate values of a first coordinate system into coordinate values of a second coordinate system.

6. The system of claim 3, further comprising:
   a map permalink database to store the permalink and the data related to the permalink;
   an external additional service data request unit configured to request external additional service data based on the permalink; and
   an external additional service data receiving unit configured to receive the external additional service data.

7. A method using a processor for generating a permalink of mash-up map data comprising a base map layer for map information and an upper map layer for additional information associated with a geographic location, the method comprising:
   generating a uniform resource locator (URL) in response to a request of a user, the URL comprising map information;
   generating one or more identifiers and delimiters for specifying each element of the mash-up map data corresponding to a geographic location, the identifiers and delimiters comprises information for hyperlinking the additional information on the base map;
   generating a permalink by combining the URL and each of the identifiers; and
   providing the permalink to the user in the form of the URL, wherein the permalink comprises the URL which comprises each of the generated identifiers as a hyperlink address corresponding to the URL to display the mash-up map data.

8. The method of claim 7, wherein information associated with the geographic location comprising one of advertisement information, additional service data, user-generated data, or any combinations thereof.

9. The method of claim 7, wherein the permalink is provided in the form of URL, and the identifiers are provided to distinguish each element of the mash-up data from each other by the delimiters.

10. The method of claim 9, wherein the request of the user is executed by using a hot key displayed on a web page together with the mash-up map data.

11. The method of claim 10, wherein the hot key provides a copy function of the permalink of the mash-up map data when displayed.

12. A non-transitory computer-readable storage medium comprising an executable program codes, which when executed, performs the method recited in claim 7.

13. A computer implemented method comprising:
   maintaining a permalink corresponding to mash-up map data, the mash-up map data combining a base map layer comprising map information and an upper map layer for at least one additional service layer comprising additional service data;

determining whether external additional service data is required by analyzing the permalink, the permalink comprising an external additional service data identifier comprising Extensible Markup Language (XML) hyperlink information for linking the external additional service data to the mash-up map data in response to receipt of a request of external additional service data;

retrieving the external additional service data in response to receipt of requiring the external additional service data; and providing the mash-up map data in the form of Uniform Resource Locator (URL) by combining the external additional service data and the mash-up map data associated with the permalink, wherein the permalink comprises the URL which comprises the external additional service data identifier as a hyperlink address corresponding to the URL to display the mash-up map data.

14. The method of claim 13, further comprising:

providing the mash-up data comprising data associated with the map permalink in response to receipt of only requiring the external additional service data.

15. A non-transitory computer-readable storage medium comprising executable program codes, which when executed, performs the method recited in claim 13.

16. A system using a computer for providing a permalink of mash-up map data comprising a base map layer for map information and an upper map layer for additional information associated with a geographic location, the system comprising:

a link generation unit, coupled to a processor of the computer, to generate one or more identifiers and delimiters corresponding to map information and to additional information associated with a geographic location to provide a permalink of mash-up map data by using the identifiers and delimiters, wherein the identifiers and the delimiters comprise information for hyperlinking the additional information on the base map, wherein the permalink of mash-up map data comprises a Uniform Resource Locator (URL) which comprises the identifiers and delimiters as hyperlink address corresponding to the URL to display the additional information;

a storage unit, coupled to the processor, to store the permalink and mash-up map data corresponding to the permalink; and a providing unit, coupled to the processor, the processor causing to provide the permalink corresponding to the mash-up map data in the form of Uniform Resource Locator (URL) in response to receipt of a user request.

17. The system of claim 16 further comprises data structures of the permalink corresponding to mash-up data, wherein the data structures comprises:

a map Uniform Resource Locator (URL) structure to generate a permalink of mash-up map data comprising a server address, a map image number, vertical and horizontal coordinates of a map image, a zoom level, spot coordinates for indicating a specific point, and area coordinates for indicating a specific area, and an upper map layer structure comprising at least one of an advertisement layer identifier, an additional service data identifier, and user-generated data identifier, the identifiers being distinguished by delimiters.

18. The system of claim 17, wherein the additional service data identifier comprises departure coordinates, a number of via-points, and destination coordinates.

19. The system of claim 17, wherein the additional service data identifier or the user-generated data identifier is Extensible Markup Language (XML) hyperlink information.

* * * * *

UNITED STATES PATENT AND TRADEMARK OFFICE
CERTIFICATE OF CORRECTION

| | | |
|---|---|---|
| PATENT NO. | : 8,271,490 B2 | Page 1 of 1 |
| APPLICATION NO. | : 12/043928 | |
| DATED | : September 18, 2012 | |
| INVENTOR(S) | : Lim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this
Twenty-sixth Day of August, 2014

Michelle K. Lee
*Deputy Director of the United States Patent and Trademark Office*